UNITED STATES PATENT OFFICE.

CHARLES G. BROMMER, OF DETROIT, MICHIGAN.

PROCESS FOR THE MANUFACTURE OF CANDY.

SPECIFICATION forming part of Letters Patent No. 229,667, dated July 6, 1880.

Application filed August 13, 1879.

*To all whom it may concern:*

Be it known that I, CHARLES G. BROMMER, of Detroit, in the county of Wayne and State of Michigan, have invented a new and useful Candy, the composition of which is fully set forth in the following description.

The object of my invention is to produce a candy by boiling to a crack glucose or grape-sugar and cane-sugar, to which is added a sufficient quantity of water to dissolve them and prevent burning, and adding to the mixture, when sufficiently cooked, gelatine dissolved in water, which gelatine solution is thoroughly mixed with the boiled glucose and cane-sugar while hot, whereby greater firmness and consistency are given the candy when cold by reason of the gelatination of the gelatine, so that the candy will not liquefy or become soft in warm weather, as gelatine is not affected by the ordinary weather temperatures, and the candy will therefore preserve its firmness and consistency, and will not liquefy or run.

Heretofore equal quantities of honey and sugar have been boiled together to produce a candy, and the whites of eggs, (or albumen,) beaten to a froth, have been added to the boiled mixture; but albumen differs materially in its properties from gelatine, is not soluble in water, as gelatine is, and therefore could not be so well diffused through the boiled honey and sugar, nor will albumen jellify and give to the boiled mixture the firmness and consistency attained by the employment of gelatine to prevent the liquefaction or running of the candy, when cold, in the ordinary weather temperatures, which are never sufficiently high to reduce the gelatine from its jellified condition to a liquid state, which would occur in warm weather if albumen were employed in lieu of gelatine, as no gelatination would occur from the use of albumen.

The main object of my invention, therefore, is to produce a candy which will not liquefy or run in warm weather; and to this end my invention consists of a candy composed of glucose and cane-sugar dissolved in water and boiled to a crack, to which is added a sufficient quantity of gelatine dissolved in water, which gelatine jellifies when cold, and prevents the liquefaction or running of the candy, when cold, in warm weather, as hereinafter more fully set forth.

In carrying out my invention I take one pound of sugar and six ounces of glucose or grape-sugar, and mix together with a sufficient quantity of water to prevent burning and to dissolve them. When the mixture is boiled to a crack I add to it one ounce of gelatine dissolved in one-quarter of a pint of water, and thoroughly mix the whole together and remove them from the fire. When sufficiently cool I pour the mixture out upon a slab or stone and allow it to set, and then cut it into strips, as desired. If desired, any flavorings may be added, as taste dictates.

Candy thus made will not liquefy or run, as ordinary candy does, in hot weather, because the gelatine diffused therein becomes jellified, and is not affected by the ordinary weather temperatures, and the candy becomes firm and more salable.

Having thus fully described my invention, what I claim as new, and desire to secure by Letters Patent, is—

1. A candy composed of sugar, grape-sugar, and gelatine, in the proportions substantially as set forth.

2. The process of making candy composed of sugar, grape-sugar, and gelatine, consisting in boiling the sugar and grape-sugar together with water, adding, when the same are cooked, the gelatine dissolved in water, and mixing the gelatinous solution with the other ingredients without further cooking, substantially as described.

CHARLES G. BROMMER.

Witnesses:
H. S. SPRAGUE,
A. BARTHEL.